US009515472B2

(12) United States Patent
Muehlmichel et al.

(10) Patent No.: US 9,515,472 B2
(45) Date of Patent: Dec. 6, 2016

(54) SINGLE WIRE SEAL FOR SEALING AN ELECTRIC CABLE IN AN APERTURE OF A TERMINAL

(71) Applicant: DELPHI INTERNATION OPERATIONS LUXEMBURG, S.A.R.L., Bascharage (LU)

(72) Inventors: Jurgen Muehlmichel, Pottenstein (DE); Kerstin Matz, Erlangen (DE); Thomas Fili, Nuremberg (DE)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 45 days.

(21) Appl. No.: 14/404,230

(22) PCT Filed: May 30, 2013

(86) PCT No.: PCT/EP2013/061147
§ 371 (c)(1),
(2) Date: Nov. 26, 2014

(87) PCT Pub. No.: WO2013/178726
PCT Pub. Date: Dec. 5, 2013

(65) Prior Publication Data
US 2015/0136471 A1    May 21, 2015

(30) Foreign Application Priority Data
May 31, 2012  (WO) .................. PCT/IB2012/001198

(51) Int. Cl.
*H02G 15/013*    (2006.01)
*H01R 13/52*    (2006.01)
*H01R 13/40*    (2006.01)

(52) U.S. Cl.
CPC ........ *H02G 15/013* (2013.01); *H01R 13/5205* (2013.01)

(58) Field of Classification Search
CPC ..................................................... H02G 15/013
(Continued)

(56) References Cited

U.S. PATENT DOCUMENTS

| 4,895,533 A | * | 1/1990 | Yagi | ................... | H01R 13/5205 439/278 |
| 4,973,266 A | * | 11/1990 | Bullard | .............. | H01R 13/5221 439/281 |

(Continued)

FOREIGN PATENT DOCUMENTS

| DE | 3904069 A1 | 8/1989 |
| DE | 19546963 A1 | 6/1997 |

(Continued)

OTHER PUBLICATIONS

Materials Data Book, 2003 Cambridge University Engineering Department.*

(Continued)

*Primary Examiner* — Michael F McAllister
(74) *Attorney, Agent, or Firm* — Robert J Myers

(57) ABSTRACT

A single wire seal for sealing an electric cable in an aperture of a terminal or a connector housing is provided. The single wire seal is provided with an essentially cylindrical shape and a through hole for the electric cable. The single wire seal further comprises a crimping portion for crimping the crimping section of a terminal on both the single wire seal and the electric cable. The single wire seal is molded out of a first, preferably relatively soft elastic material having a Young's modulus. For reducing deformations of the single wire seal due to the crimping, the single wire seal is further provided with a reinforcement element arranged at the crimping portion. The reinforcement element is preferably provided with at least one ring shaped portion. The reinforcement (Continued)

element is molded out of a second material, which has a higher Young's modulus than the first material.

30 Claims, 3 Drawing Sheets

(58) Field of Classification Search
USPC ....... 174/135, 84 C; 439/589, 274, 275, 279, 439/587
See application file for complete search history.

(56) References Cited

U.S. PATENT DOCUMENTS

| | | | | |
|---|---|---|---|---|
| 5,356,312 | A * | 10/1994 | Abe | H01R 13/5205 439/278 |
| 5,660,566 | A * | 8/1997 | Ohsumi | H01R 13/5205 439/275 |
| 5,824,962 | A * | 10/1998 | Katsuma | H01R 43/005 174/135 |
| 7,211,731 | B2 * | 5/2007 | Nagamine | H01R 43/005 174/74 R |
| 2006/0014412 | A1 | 1/2006 | Lutsch et al. | |
| 2013/0277920 | A1 | 10/2013 | Kobayashi et al. | |

FOREIGN PATENT DOCUMENTS

| | | |
|---|---|---|
| DE | 19828482 A1 | 12/1999 |
| EP | 2608324 A1 | 6/2013 |
| JP | 10321288 A | 12/1998 |
| JP | 11111362 A | 4/1999 |
| JP | 11219752 A | 8/1999 |
| WO | 2012023438 A1 | 2/2012 |

OTHER PUBLICATIONS

Modulus of Elasticity or Young's Modulus- and Tensile Modulus for some common Materials Engineering Toolbox Apr. 23, 2006.*
International Search Report for International Application No. PCT/EP2013/061147, published Aug. 1, 2013.

* cited by examiner

SINGLE WIRE SEAL FOR SEALING AN ELECTRIC CABLE IN AN APERTURE OF A TERMINAL

CROSS-REFERENCE TO RELATED APPLICATION

This application is a national stage application under 35 U.S.C. §371 of PCT Application Number PCT/EP2013/061147 having an international filing date of May 30, 2013, which designated the United States, said PCT application claiming the benefit of PCT Application Number PCT/IB2012/0011198, having an international filing date of May 31, 2013, which also designated the United States, the entire disclosure of each of which are hereby incorporated herein by reference.

TECHNICAL FIELD OF THE INVENTION

The present invention relates to a single wire seal for seating an electric cable in an aperture of a terminal or a connector housing, and in particular to a single wire seal which is to be attached onto the electric cable.

BACKGROUND OF THE INVENTION

In many applications, it is necessary to mount electrical cables to terminals or connector housings and to seal the connection against moisture or dust etc. To this end so-called single wire seals are known in the art, which are arranged onto the cable sheath and which provide a seal between the cable and inner walls of the terminal or the connector housing.

The elastic single wire seal is commonly attached to the electric cable and in particular by means of the crimping means of electrical contact terminals provided at the end of the cable. Thereby, the seal is securely fixed to the cable. However, since the sealing member, i.e. the single wire seal, is made of a highly elastic material, the crimping may lead to severe deformations of the single wire seal. These deformations do not only impair the sealing properties of the single wire seal, but also have the effect that the minimum pull force requirements between the single wire seal and the electric cable are no longer met. Thereby, a loosening of the crimped connection between the electric cable and the single wire seal may occur during handling of the cable or when pulling the crimped terminal out of a housing.

A typical prior art document dealing with the crimping of elastic single wire seals is DE 3904069 A1. This document discloses a waterproof plug for a connector. The waterproof plug comprises a rubber plug having an outer tube portion capable of fitting to an inner wall of a connector housing, a stabilizing tube rigidity mounted next to the outer tube portion of said rubber plug, and an electric wire inserting hole in the central portion thereof.

A further prior art document dealing with elastic single wire seals is DE 19828482 A1. This document discloses a single wire seal for sealing a gap between a conductor and a connector chamber. A reinforcement region is joined to a sealing region of a sealing body. Further, reinforcement ribs are connected on a first side to a hollow cylindrical base of the reinforcement region, and on an adjacent second side to a sealing lip.

However, the number of electric devices loaded on e.g. vehicles recently increased and therefore smaller sizes of electrical contact elements and connector housings are demanded. As the negative influence of the crimping on the sealing properties and the minimum pull force requirements is even worse for small single wire seals a huge demand exists for further improved single wire seals and in particular for single wire seals adapted for relatively thin cables.

Although single wire seals are not expensive components, they are mass products and have therefore a considerable influence on the production quality and the production costs of a large number of products. Therefore, it is important to optimize the manufacture of such single wire seals to reduce the manufacturing costs while, at the same time, securing a tight and sufficient fit in a connector housing.

BRIEF SUMMARY OF THE INVENTION

According to the invention, a single wire seal for sealing an electric cable in an aperture of a terminal or a connector housing is provided. The term "cable" comprises all kinds of one- or multiple-pole wires.

The single wire seal is provided with an essentially cylindrical shape and a through hole for the electric cable. The single wire seal is molded out of a first, preferably relatively soft elastic material, and in particular out of a silicone-based material with a Young's modulus $E1$. The single wire seal is provided with a crimping portion where the terminal crimping wings are crimped onto both the single wire seal and the electric cable. Due to the relatively soft material of the single wire seal, this crimping leads to a substantial deformation of the materials of the relatively soft single wire seal.

Therefore, the crimping portion of the single wire seal of the present invention is further provided with a reinforcement element. The reinforcement element improves the crimping, "protects" the single wire seal during the crimping and reduces deformations of the relatively soft single wire seal. Therefore, the sealing properties and the minimum pull force remain fairly constant and the risk of a loosening of the crimped connection between the electric cable and the single wire seal is reduced. The reinforcement element is arranged at and preferably around the crimping portion of the single wire seal and is provided with at least one ring shaped portion or preferably with two to four ring shaped portions axially spaced apart from each other. The ring shaped portion can be continuous or intermittent over the ring circumference. The reinforcement element is molded from a second material, and in particular a plastic material, which has a higher Young's modulus $E2$ than the first material.

Preferably, the ratio of Young's modulus $E2/E1$ is at least 10 preferably at least 20, more preferably at least 50, even more preferably at least 75, and most preferably at least 100. Further preferably, Young's modulus $E1$ is in the range between 0.01 to 1.0 kilonewtons per square millimeter ($kN/mm^2$), more preferably between 0.02 to 0.5 $kN/mm^2$, more preferably between 0.03 to 0.2 $kN/mm^2$, and most preferably between 0.035 to 0.1 $kN/mm^2$. Further preferably, Young's modulus $E2$ is in the range between 0.75 to 250 $kN/mm^2$, more preferably between 1.0 to 25 $kN/mm^2$, more preferably between 1.5 to 15 $kN/mm^2$, and most preferably between 2.0 to 5 $kN/mm^2$. As can be taken from the above cited values, the second material can be a plastic material, a reinforced plastic material, a compound material, metal or the like.

The second material can also be the same material as the first material, but with amended properties due to e.g. other manufacturing processes, different structures, fiber reinforcements, coatings or the like.

The minimum pull force requirement between the single wire seal and the electric cable achieved according to the invention lie in the range of 3 to 30 Newtons (N), more preferably 4 to 20 N, and most preferably 5 to 15 N.

Preferably, the single wire seal is manufactured integrally by a two component molding procedure. The reinforcement element is thereby fastened with the single wire seal by the two-component molding, i.e. the two materials (components) form one integral part. However, the fixation between sealing material and reinforcing element can additionally be improved by a form fit between the reinforcement element and the single wire seal. For example, if the reinforcing element is provided with a ring shape, it fits into a corresponding groove of the single wire seal or it may be fastened on the single wire seal by a saw tooth connection or the like. The construction of the mating connection between the ring shaped portion and the single wire seal depends inter alia on the materials used, the desired properties of the connection and the operating conditions of the single wire seal.

The reinforcement element can be arranged on the outside or on the inside of the single wire seal depending on the operating conditions of the single wire seal.

The reinforcement element may overlap in an axial direction between 10 and 80 percent of the sealing part, and in particular between 20 and 70 percent, and more in particular 30 to 60 percent. A larger overlapping leads to a stronger and stiffer connection. A smaller overlapping leads to a more flexible and bendable connection, which is easier to assemble. The reinforcement element may be provided with a constant inner diameter or a tapered diameter. The single wire seal may be rotation symmetrical. In all the embodiments of the invention, it is preferred that the reinforcing element makes up only a small part of the single wire seal. In weight percentage e.g. only 5 top 30% of the overall weight (i.e. the weight of the single wire seal plus the weight of the reinforcing element), more preferably between 5 and 25% and most preferably between 6 and 20%.

Preferably, the reinforcement element may be provided with at least one flange for a connection with an adjacent component of a terminal or a connector housing, and more preferably, the flange may have a larger radial extension than the remaining part of the reinforcement element to improve the connection of the single wire seal with the adjacent component.

Preferably, the single wire seal is provided on its exterior surface with an essentially smooth outer surface area and at least one sealing lip for cooperation with an inner wall of the aperture of the terminal or the connector housing. Further, the single wire seal may be provided on its interior surface with at least one fastening projection for cooperation with the electric cable.

Due to its configuration, the singe wire seal may be manufactured by a two-component molding process which is faster and more cost-effective, than two conventional molding procedures or an assembly from two or more pre-prepared parts.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

It is an object of the present invention to improve the situation described above in the BACKGROUND OF THE INVENTION by providing an improved single wire seal which can be crimped without degrading the sealing properties and the minimum pull force requirements. It is another object of the present invention to provide single wire seals which can be manufactured with reduced number of steps and costs.

Figure 1:
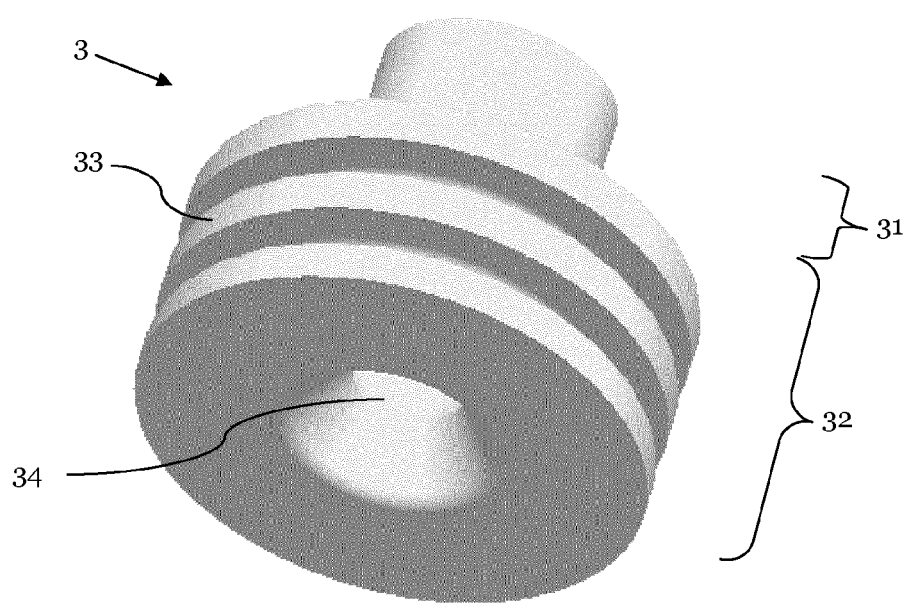
FIG. 1 shows a 3D-illustration of a single sire seal.

FIG. 1 shows a 3D-illustration of a single wire seal 3 to be attached to an electric cable (not shown) for sealing the electric cable in an aperture of a terminal (not shown) or a connector housing (not shown). The rotation symmetrical single wire seal 3 is provided with an essentially cylindrical shape and a through hole 34 for the electric cable. The single wire seal 3 is further provided with a crimping portion 31 and with a sealing portion 32 having an essentially smooth outer surface area with some ring-shaped sealing lips 33, extending between a smaller diameter and a larger diameter, for cooperation with an inner wall of the aperture of the terminal or the connector housing.

The single wire seal 3 is molded from a first elastic material, which is a silicone-based material having a Young's modulus E1.

Figure 2:
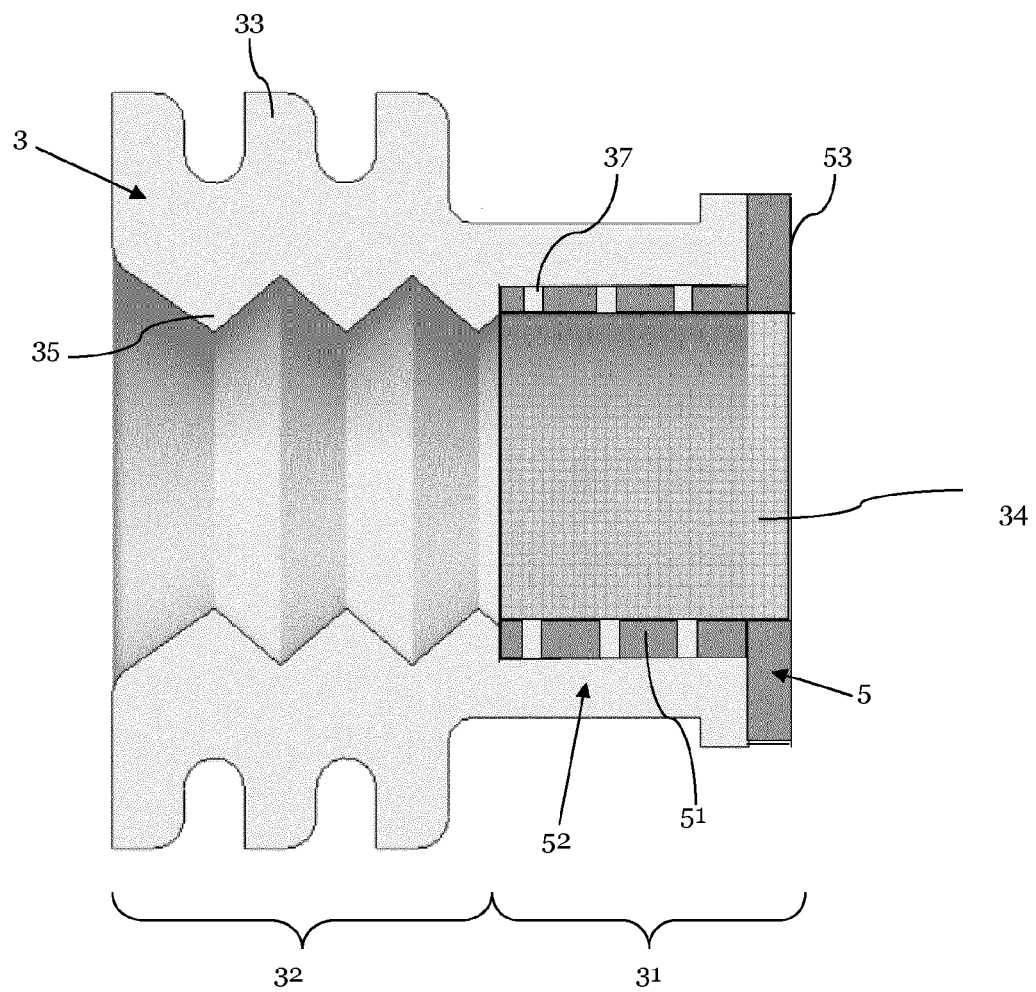
FIG. 2 shows a cross section of a single wire seal provided with a reinforcement element arranged on the inside of the single wire seal.

FIG. 2 shows a cross section of the single wire seal 3 to be crimped to an electric cable (not shown). As the skilled person will recognize, in assembled condition, a cable is inserted through the through hole 34 and extends from one end of the single wire seal 3 to the other. Preferably, the free end of the cable is provided with a per se known electrical contact terminal, with crimping wings to attach the terminal to the cable. These crimping wings of the terminal can be used to crimp also the single wire seal 3 via the crimping portion 31 onto the cable. Thereby, a separate crimping member is not necessary.

The single wire seal 3 comprises a reinforcement element 5 for improving the crimped connection between the electric cable and the single wire seal 3. The reinforcement element 5 is arranged around the inside of the crimping portion 31 of the single wire seal 3 and comprises several ring shaped portions 51.

As the skilled person will recognize, the single wire seal 3 is rotation symmetrical and can easily be manufactured by a two-component molding process. The reinforcement element 5 is thereby bonded to the single wire seal 3. In addition, due to the form fit bet the reinforcement element 5 and the single wire seal 3, a further fixation is provided. This form fit is achieved due to the ring-shaped portions 51 mating or fitting into several groove shaped portions 37 of the single wire seal 3. In the shown embodiment, the four ring-shaped portions 51 and the three groove shaped portions 37 provide together saw tooth connection 52.

The reinforcement element 5 is molded from a stiffer second material, which might be a plastic, a compound material, or the like, and which has a higher Young's modulus E2 than the softer first material of the single wire seal 3.

The reinforcement element 5 is provided with a constant inner diameter and overlaps about 40 percent of the sealing portion 32 in an axial direction. The ring-shaped portions 51 of the reinforcement element 5 are continuous and not intermittent.

The reinforcement element 5 is further provided with a radial flange 53 for a connection with an adjacent component, as for example a shoulder (not shown) of the connector housing. The radial flange 53 also improves the retention of the single wire seal 3 between the crimping wings. The radial flange 53 has a larger radial extension than the remaining (left in FIG. 2) part of the reinforcement element 5. This radial flange 53 blocks a movement of the seal in at least one axial direction and thereby improves the pull-out safety.

The single wire seal 3 is again provided on its sealing portion 32 with an essentially smooth outer surface with a smaller diameter and some ring-shaped sealing lips 33 with a larger diameter for cooperation with an inner wall of the aperture of the connector housing. The single wire seal 3 is also provided with a through hole 34 comprising several fastening projections 35 for cooperation, and possibly sealing, with the electric cable.

Figure 3:
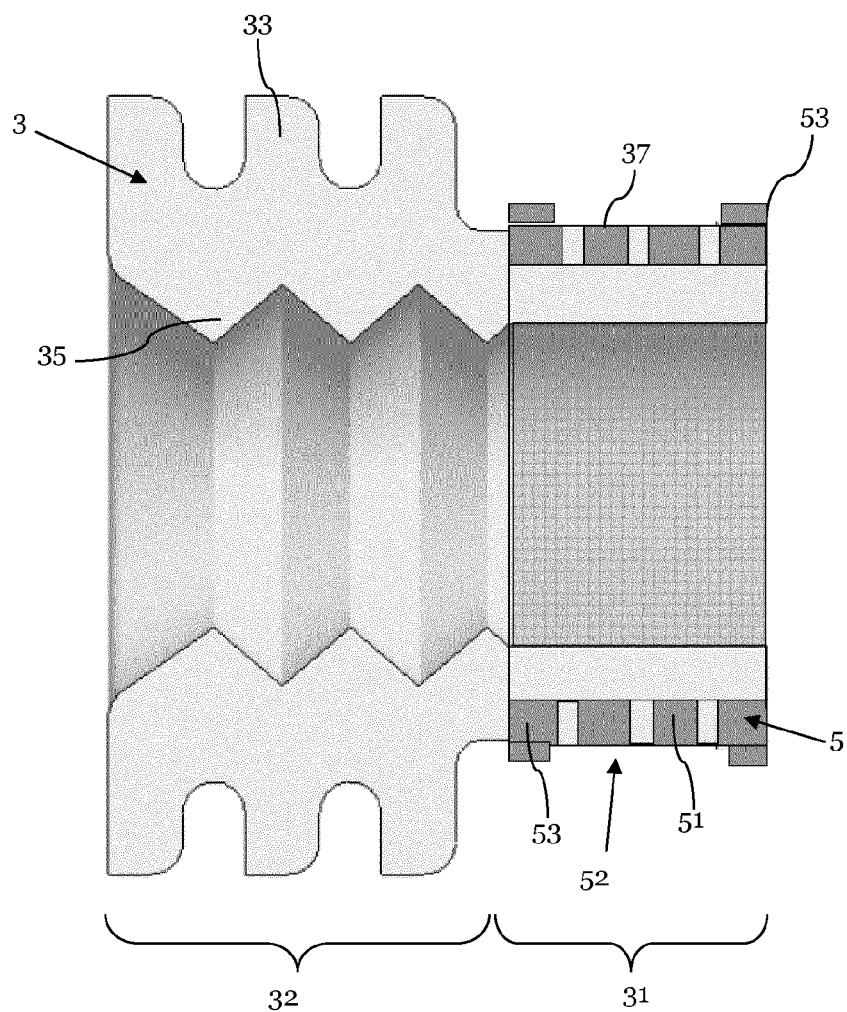
FIG. 3 shows a cross section of a single wire seal provided with a reinforcement element arranged on the outside of the single wire seal.

FIG. 3 shows another cross section of the single wire seal 3 to be crimped to an electric cable (not shown). The single wire seal 3 comprises a reinforcement element 5 which is arranged, in contrast to FIG. 2, on the outside of the single wire seal 3. It also comprises several ring shaped portions 51 mating into several groove shaped portions 37 of the single wire seal 3. The several mating ring-shaped and groove shaped portions 51, 37 together provide a saw tooth connection 52.

The reinforcement element 5 is also provided with a radial flange 53 for a connection with an adjacent component (not shown) of the connector housing or for retention between crimping wings. The radial flange 53 has a larger radial extension than the retraining (left in FIG. 3) part of the reinforcement element 5. The reinforcement element 5 is further provided with a second radial flange 53 for a better retention between crimping wings.

The single wire seal 3 is again provided on its exterior surface with the essentially smooth outer crimping portion 31 with a smaller diameter and a sealing portion 32 having some ring-shaped sealing lips 33 with a larger diameter for cooperation with an inner wall of the aperture of the connector housing. The single wire seal 3 is also provided with a through hole 34 comprising several fastening projections 35 for cooperation with the electric cable.

The reinforcement element 5 may also be not continuous with gaps (not shown). Further, it is also possible that the at least one ring-shaped portion 51 completely passes through the crimping portion 31 of the single wire seal 3 and directly contacts the electric cable.

We claim:

1. A single wire seal molded from a silicone-based elastic first material for sealing an electric cable in an aperture of a terminal or a connector housing, the single wire seal comprising:
    a crimping portion configured to attach the single wire seal onto said electric cable;
    a sealing portion, wherein the single wire seal is provided with an essentially cylindrical shape and a through hole for the electric cable; and
    a reinforcement element molded from a plastic second material and arranged at the crimping portion, wherein the reinforcement element is provided with at least one ring shaped portion continuous about its circumference, wherein the reinforcement element comprises two to four ring shaped portions axially spaced apart from each other.

2. The single wire seal according to claim 1, wherein the sealing portion defines at least one sealing lip for cooperation with an inner wall of the aperture of the terminal or the connector housing.

3. The single wire seal according to claim 1, wherein the reinforcement element is arranged around the crimping portion of the single wire seal.

4. The single wire seal according to claim 1, wherein the reinforcement element overlaps between 10 and 80 percent of the sealing portion in an axial direction.

5. The single wire seal according to claim 1, wherein the reinforcement element is provided with at least one radial flange for a connection with an adjacent component of the terminal, the connector housing or crimping wings.

6. The single wire seal according to the claim 5, wherein the at least one radial flange has a larger radial extension than the at least one ring shaped portion.

7. The single wire seal according to claim 1, wherein the single wire seal is manufactured integrally by a two-component molding procedure.

8. The single wire seal according to claim 1, wherein the reinforcement element is fastened on the single wire seal by a two-component molding procedure, thereby providing a form fit between the reinforcement element and the single wire seal.

9. A single wire seal molded from a silicone-based elastic first material for sealing an electric cable in an aperture of a terminal or a connector housing, the single wire seal comprising:
    a crimping portion configured to attach the single wire seal onto said electric cable;
    a sealing portion, wherein the single wire seal is provided with an essentially cylindrical shape and a through hole for the electric cable; and
    a reinforcement element molded from a plastic second material and arranged at the crimping portion, wherein the reinforcement element is provided with at least one ring shaped portion continuous about its circumference, wherein
    the at least one ring shaped portion is arranged in at least one groove shaped portion of the single wire seal.

10. The single wire seal according to claim 1, wherein the reinforcement element is fastened on the single wire seal by a saw tooth connection.

11. The single wire seal according to claim 1, wherein the reinforcement element is arranged on the inside of the crimping portion of the single wire seal.

12. The single wire seal according to claim 1, wherein the reinforcement element is arranged on the outside of the crimping portion of the single wire seal.

13. The single wire seal according to claim 1, wherein the single wire seal is rotationally symmetrical.

14. The single wire seal according to claim 1, wherein the silicone-based elastic first material has a first Young's modulus and the plastic second material-has a second Young's modulus and wherein a ratio of a value of the second Young's modulus to a value of the first Young's modulus is at least 75.

15. The single wire seal according to claim 14, wherein the value of the first Young's modulus of the first material is in a range between 0.01 to 1.0 kN/mm$^2$.

16. The single wire seal according to claim 15, wherein the value of the second Young's modulus of the second material is in a range between 0.75 to 250 kN/mm$^2$.

17. The single wire seal according to claim 9, wherein the sealing portion defines at least one sealing lip for cooperation with an inner wall of the aperture of the terminal or the connector housing.

18. The single wire seal according to claim 9, wherein the reinforcement element is arranged around the crimping portion of the single wire seal.

19. The single wire seal according to claim 9, wherein the reinforcement element overlaps between 10 and 80 percent of the sealing portion in an axial direction.

20. The single wire seal according to claim 9, wherein the reinforcement element is provided with at least one radial flange for a connection with an adjacent component of the terminal, the connector housing or crimping wings.

21. The single wire seal according to claim 9, wherein the at least one radial flange has a larger radial extension than the at least one ring shaped portion.

22. The single wire seal according to claim 9, wherein the single wire seal is manufactured integrally by a two-component molding procedure.

23. The single wire seal according to claim 9, wherein the reinforcement element is fastened on the single wire seal by a two-component molding procedure, thereby providing a form fit between the reinforcement element and the single wire seal.

24. The single wire seal according to claim 9, wherein the reinforcement element is fastened on the single wire seal by a saw tooth connection.

25. The single wire seal according to claim 9, wherein the reinforcement element is arranged on the inside of the crimping portion of the single wire seal.

26. The single wire seal according to claim 9, wherein the reinforcement element is arranged on the outside of the crimping portion of the single wire seal.

27. The single wire seal according to claim 9, wherein the single wire seal is rotationally symmetrical.

28. The single wire seal according to claim 9, wherein the silicone-based elastic first material has a first Young's modulus and the plastic second material-has a second Young's modulus and wherein a ratio of a value of the second Young's modulus to a value of the first Young's modulus is at least 75.

29. The single wire seal according to claim 28, wherein the value of the first Young's modulus of the first material is in a range between 0.01 to 1.0 $kN/mm^2$.

30. The single wire seal according to claim 29, wherein the value of the second Young's modulus of the second material is in a range between 0.75 to 250 $kN/mm^2$.

* * * * *